United States Patent
Poetsch et al.

(12)

(10) Patent No.: US 6,291,065 B1
(45) Date of Patent: Sep. 18, 2001

(54) PIGMENT FLAKES

(75) Inventors: Eike Poetsch, Mühltal; Gerhard Pfaff, Münster; Matthias Kuntz, Seeheim; Stephan Derow, Darmstadt; David Coates, Dorset, all of (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/381,504

(22) PCT Filed: Mar. 13, 1998

(86) PCT No.: PCT/EP98/01453

§ 371 Date: Sep. 21, 1999

§ 102(e) Date: Sep. 21, 1999

(87) PCT Pub. No.: WO98/42799

PCT Pub. Date: Oct. 1, 1998

(30) Foreign Application Priority Data

Mar. 21, 1997 (EP) .................................................. 97104854

(51) Int. Cl.[7] .......................... C09K 19/02; C09K 19/38; C09D 5/33; C09D 1/10; B32B 3/00
(52) U.S. Cl. ............................ 428/363; 428/1; 428/1.31; 428/29; 428/324; 428/325; 428/327; 428/195; 428/407; 506/259; 506/273; 506/282; 506/284; 506/310; 506/328; 106/31.15; 106/31.27; 523/205; 252/299.01; 252/299.1; 252/582; 252/586
(58) Field of Search .................................. 522/75, 81, 42, 522/152, 153, 154, 83; 526/310, 328, 284, 273, 282, 259; 428/29, 1, 1.31, 195, 324, 325, 327, 363, 407; 252/299.01, 299.1, 582, 586; 106/31.15, 31.27

(56) References Cited

U.S. PATENT DOCUMENTS

| | | |
|---|---|---|
| 4,631,328 | 12/1986 | Ringsdorf et al. . |
| 4,702,945 | 10/1987 | Etzbach et al. . |
| 4,943,617 | 7/1990 | Etzbach et al. . |
| 5,059,000 * | 10/1991 | Kaneko et al. . |
| 5,187,248 * | 2/1993 | Etzbach et al. . |
| 5,455,697 * | 10/1995 | Coles et al. . |
| 5,807,497 * | 9/1998 | Gailberger et al. . |
| 5,814,141 * | 9/1998 | Kirschbaum et al. . |
| 5,834,064 * | 11/1998 | Dietz et al. . |
| 5,876,837 * | 3/1999 | Sailer et al. . |
| 5,922,465 * | 7/1999 | Gailberger et al. . |

FOREIGN PATENT DOCUMENTS

| | | |
|---|---|---|
| 90282 | 10/1983 | (EP) . |
| 171045 | 2/1986 | (EP) . |
| 260687 | 3/1988 | (EP) . |
| 2311289 | 9/1997 | (GB) . |
| 9617901 | 6/1996 | (WO) . |
| 9730136 | 8/1997 | (WO) . |
| 9800475 | 1/1998 | (WO) . |

* cited by examiner

*Primary Examiner*—Susan W. Berman
(74) *Attorney, Agent, or Firm*—Millen White Zelano & Branigan

(57) ABSTRACT

Described are pigment flakes having a chiral liquid crystalline polymer material, the polymer material serving as a carrier material or being coated onto a carrier material. The pigment flakes have at least one dye that is chemically bound to the polymer. Also described are methods of making such pigment flakes and using them in paints, printing inks, spray paints, cosmetic products, colored plastics, optical elements and security applications.

18 Claims, No Drawings

PIGMENT FLAKES

The invention relates to pigment flakes comprising a chiral liquid crystalline polymer material, said chiral liquid crystalline polymer material serving as carrier material or being coated onto a carrier material, characterized in that the pigment flakes comprise at least one dye that is chemically bound to the polymer.

The invention further relates to methods of manufacturing such pigment flakes and to the use of such pigment flakes in paints, printing inks, spray paints, cosmetic products or coloured plastics, optical elements and security applications.

Liquid crystals with chiral mesophases, in particular cholesteric liquid crystals, show extraordinary colour effects, like for example a high colour saturation, a wide colour range and iridescent appearance, due to their property of reflecting selected wavelengths of incident light. They have therefore been proposed for the preparation of pigments and inks.

In order to achieve good colour properties, a uniform and stable alignment of the liquid crystal molecules with the orientation of the helix axis parallel to the viewing direction is required. This can be achieved by preparing pigment flakes or platelets of a prealigned cholesteric polymer material.

Polymer pigment flakes are produced e.g. by coating a thin film of a cholesteric polymer material onto a substrate and aligning the material to achieve uniform orientation of the helical axis normal to the surface of the substrate. The film is then cured and ground to yield small flat flakes. The pigment flakes can be dispersed e.g. in a transparent binder for the use as inks or paints. The pigment flakes and inks can be used at room temperature without the need of further alignment.

Regarding the broad range of applications for chiral liquid crystal pigment flakes it is desirable for the expert to have available further pigments of this type which are easy to synthesize and fulfill the various requirements as described above.

Pigments comprising cholesteric liquid crystal polymers are described in prior art.

The European Patent 0 601 483 discloses cholesteric pigment flakes made of polysiloxanes with side chains comprising chiral cholesterol moieties and methacrylate groups as crosslinking agent However, the preparation of pigments according to the EP 0 601 483 is complicated as it requires at least three subsequent reaction steps wherein polymerizable material is used. First, a linear or cyclic polysiloxane backbone is prepared, onto which then side chains bearing chiral moieties and polymerizable methacrylate groups are attached. Finally the polymerizable side chains are crosslinked upon preparation of the pigment flakes.

Thus, there is a demand for chiral liquid crystal pigment flakes that can be made in a very simple mamer which also enables.easy and direct control of the optical and mechanical properties of the product.

Another important aspect of the present invention is to provide new materials for the preparation of liquid crystal pigment flakes. Thus, it has been found that, when the specific optical properties of a chiral liquid crystal polymer are combined with those of a fluorescent dye, which can be chemically linked to the liquid crystal polymer, it is possible to achieve new pigments with extraordinary colour appearance.

The WO 95-32247 discloses interference pigments comprising liquid crystalline polymers which are made of mono- and difunctional nematic and chiral (meth)acrylates, epozades or vinyl ethers. However, there is no hint to polymers comprising fluorescent dyes.

Liquid crystal polymers comprising dichroic or fluorescent dyes have been described in prior art for the use as optical storage materials or fluorescent displays, e.g. in the EP 090 282, EP 171 045, EP 260 687, EP 399 279, EP 422 535 or EP 630 954. However, these documents only mention linear polymers. They also give no hint to use the materials for the preparation of pigments.

One of the aims of the present invention is to provide pigment flakes which have the properties and advantages as described above, and which can be prepared in a simple way that also enables to easily and directly control the properties of the product.

Another aim of the invention is to extend the pool of liquid crystalline pigments available to the expert. Other aims of the present invention are immediately evident to the person skilled in the art from the following detailed description.

The term 'flakes' as it is used throughout the claims and the description of this invention comprises small size particles with dimensions of 1 $\mu$m to 2 mm. These particles can be granules of a symmetric or unsymmetric shape as well as platelets having average lateral dimensions several times larger than the thickness, or mixtures of both platelets and granules. Platelet shaped pigment flakes are especially preferred.

The term 'chiral liquid crystalline polymer' as used throughout the claims and the description of this invention encompasses polymers that exhibit a chiral mesophase, like e.g. a chiral nematic (=cholesteric) or a chiral smectic phase. Polymers exhibiting a chiral nematic phase or a chiral smectic C phase are preferred. Particularly preferred are polymers exhibiting a chiral nematic phase.

The terms polymerizable or reactive mesogen, polymerizable or reactive mesogenic compound, polymerizable or reactive liquid crystal and polymerizable or reactive liquid crystalline compound as used in the foregoing and the following comprise compounds with a rodlike, boardlike or disklike mesogenic group. These mesogenic compounds do not necessarily have to exhibit mesophase behaviour by themselves. In a preferred embodiment of the present invention they show mesophase behaviour in mixtures with other compounds or after polymerization of the pure mesogenic compounds or of the mixtures comprising the mesogenic compounds.

One of the objects of the present invention are pigment flakes comprising a chiral liquid crystalline polymer material, said chiral liquid crystalline polymer material serving as carrier material or being coated onto a carrier material, characterized in that the pigment flakes comprise at least one dye that is chemically bound to the liquid crystalline polymer.

Preferred embodiments of the present invention relate to

Pigment flakes wherein at least one of the chemically bound dyes is a fluorescent dye.

Pigment flakes that additionally comprise one or more dyes or pigments which are not chemically bound to the liquid crystalline polymer material.

Pigment flakes wherein the liquid crystalline polymer material forms a three dimensional network.

Pigment flakes with a thickness from 0.1 to 100 $\mu$m and lateral dimensions from 1 to 1000 $\mu$m.

Pigment flakes wherein mica is used as carrier material.

Another object of the present invention are pigment flakes comprising a chiral liquid crystalline polymer material, said chiral liquid crystalline polymer material being coated onto a carrier material, wherein said pigment flakes are obtainable from a chiral polymerizable mesogenic material by a process comprising the following steps a) coating a thin layer of the chiral polymerizable mesogenic material onto the carrier material, b) aligning the chiral polymerizable mesogenic material in the coated layer into a uniform orientation, c) polymerizing said chiral polymerizable mesogenic material by exposure to heat or actinic radiation.

Another object of the present invention are pigment flakes comprising a chiral liquid crystalline polymer material, said chiral liquid crystalline polymer material serving as carrier material, wherein said pigment flakes are obtainable from a chiral polymerizable mesogenic material by a process comprising the following steps a) coating a thin layer of the chiral polymerizable mesogenic material onto a substrate or between two substrates, b) aligning the chiral polymerizable mesogenic material in the coated layer into a uniform orientation, c) polymerizing said chiral polymerizable mesogenic material by exposure to heat or actinic radiation, d) optionally removing the substrate, or, if two substrates are present, one or both of the substrates from the polymerized material, e) grinding the polymer film into small particles of the desired dimensions.

In a preferred embodiment of the present invention, the chiral polymerizable mesogenic material comprises at least two polymerizable mesogenic compounds, at least one of which comprises a chromophoric group.

In another preferred embodiment of the present invention, the chiral polymerizable mesogenic material comprises at least one polymerizable mesogenic compound having one polymerizable functional group and at least one polymerizable mesogenic compound having two or more polymerizable functional groups.

In another preferred embodiment of the present invention the chiral polymerizable mesogenic material comprises at least one chiral polymerizable mesogenic compound and at least one achiral polymerizable mesogenic compound.

Another object of the present invention is the use of pigment flakes as effect pigments in paints, printing inks, spray paints, cosmetic products or coloured plastics, and for active and passive optical elements and security applications.

To induce the chiral phase behaviour in the polymerizable mesogenic material, for example a mixture comprising an achiral and a chiral mesogenic polymerizable compound can be used. For example, to induce cholesteric phase behaviour, a chiral nematic and an achiral nematic polymerizable compound are used. The chiral nematic compound brings about the helically twisted cholesteric phase structure.

Since the pitch of the cholesteric helix is depending on the chemical constitution and the concentration of the chiral compound, the wavelength of the reflection maximum and therewith the colour properties of the flakes can be controlled directly in the production process just by varying the type and the ratio of the chiral mesogenic compound. Thus tailor-made pigment flakes with the desired colours can be prepared.

The ability of a chiral compound to induce a cholesteric structure structure with a certain helical pitch in a nematic host material is called its helical twisting power (HTP). If a compound with a high HTP is used, only a small amount is sufficient to achieve a cholesteric structure with reflection of visible light. In this case it is not necessary that the chiral compound exhibits a liquid crystal phase per se. It is sufficient that the mixture of the chiral and achiral compounds shows a liquid crystal phase.

The pigment flakes according to the present invention either comprise a liquid crystalline polymer material which is coated onto a carrier material, or the liquid crystalline polymer material itself serves as the carrier material.

Pigment flakes comprising a carrier material are preferably prepared by the following method a) coating a thin layer of a chiral polymerizable mesogenic material onto the carrier material, b) aligning the chiral polymerizable mesogenic material in the coated layer into a uniform orientation, c) polymerizing said chiral polymerizable mesogenic material by exposure to heat or actinic radiation.

Preferably platelet shaped carrier materials are used. As carrier material for example natural or synthetic mica (muscovite or phlogopite), kaoline, talc, silica flakes, glass flakes or mixtures of two or more of these materials can be used.

In a preferred embodiment of the present invention mica is used as carrier material.

Pigment flakes wherein the liquid crystalline polymer material itself serves as the carrier material are preferably prepared by the following method a) coating a thin layer of a chiral polymerizable mesogenic material onto a substrate or between two substrates, b) aligning the chiral polymerizable mesogenic material in the coated layer into a uniform orientation, c) polymerizing said chiral polymerizable mesogenic material by exposure to heat or actinic radiation, d) optionally removing the substrate, or, if two substrates are present, one or both of the substrates from the polymerized material, e) grinding the polymer film into small particles of the desired dimensions.

The mixture of the achiral and chiral polymerizable mesogenic compounds is coated onto a substrate, aligned and cured into a polymer film. As a substrate for example a polyester (PET) film can be used. To achieve uniform alignment with planar orientation, i.e. orientation of the helix axes normal to the surface of the coated mixture, the film can be sheared for example by means of a doctor's blade. In another preferred embodiment, a second PET layer is laminated on top of the coated material. In this case, the shearing caused by putting the two substrates together is sufficient to give good alignment The alignment is preferably carried out in the cholesteric phase of the mixture of the mesogenic compounds prior to polymerization. Therefore alignment of a high quality can be achieved considerably easier than for a coated polymer film as described in prior art due to the lower viscosity of the unpolymerized material. The application of electric or magnetic fields is not necessary.

Furthermore, since mixtures of polymerizable mesogenic monomers normally exhibit broad nematic or cholesteric mesophase ranges with relatively low melting temperatures, the polymerizable material can be aligned and cured at low temperatures, preferably below 100° C., in particular between 30 and 80° C.

Due to the temperature dependency of the cholesteric pitch, the variation of the curing temperature leads to flakes with different maxima of selective reflection, thus providing another way to control the colour properties of the flakes, in addition to variation of the ratio of the chiral and achiral polymerizable mesogenic compounds.

Besides the above mentioned components, the mixture may comprise one or more other suitable components such as, for example, catalysts, light- or temperature-sensitive initiators, id stabilizers, co-reacting monomers or surface-active compounds. It is alternatively possible to add, for example, a quantity of up to 20% by weight of a nonpolymerizable liquid-crystalline material to adapt the optical properties of the product. It is also possible to add up to 10% of a non mesogenic compound with one or more polymerizable functional groups to increase crosslinking.

In some cases it is desirable to improve the wetting of the carrier material onto which the chiral polymerizable mesogenic material is coated. This can be of importance in particular when carrier materials with a polar surface, like e.g. mica, are used, which are then coated with an inventive chiral polymerizable mesogenic material comprising unpolar mesogenic and chromophoric and/or fluorescent components.

For the preparation of inventive pigment flakes comprising a carrier material that is covered by a chiral polymerizable mesogenic material either by chemi- or physisorption, wherein the surface of the carrier material and the chiral polymerizable mesogenic material have different degree of polarity, the surface of the carrier material preferably is changed by wetting agents.

The use of wetting agents is particularly preferred for the preparation of inventive pigment flakes comprising a carrier material with a surface exhibiting high polarity and a chiral polymerizable mesogenic material exhibiting a moderate or weak polarity or being unpolar.

Wetting agents can be used which are either coreactive, like e.g.

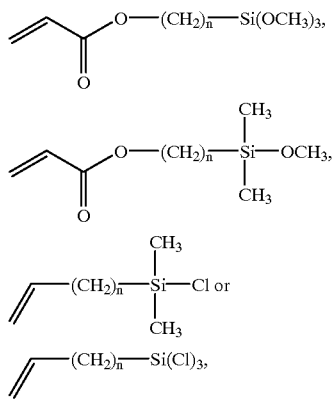

or which at least modify the surface by their unpolar headgroups, like e.g. the following compounds

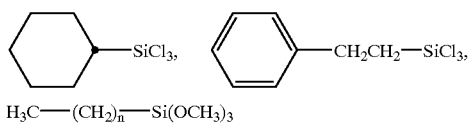

or $(n\text{-}C_nH_{2n+1})_2\text{—}SiCl_2$, wherein n is from 1 to 9.

It is also possible to modify the surface of the carrier material by coreactive physisorbed wetting agents, e.g. by acrylates like for example pentaerythritol acrylate, which are coreactive with the other components that are coated on the surface of the carrier material.

Apart from the exemplary compounds specified above, it is also possible to use as wetting agents any other materials that are known to the skilled in the art for this purpose.

In the curing process the polymerizable groups of the aligned material react to form a crosslinked polymer film. Thereby the helical orientation is frozen in. The polymerization can be carried out for example by exposure to UV light with the help of a photoinitiator that decomposes under irradiation to produce free radicals that start the polymerization reaction. In another preferred embodiment a cationic photoinitiator is used that photocures with cations instead of free radicals. The polymerization may also be started by an initiator that decomposes when heated above a certain temperature.

To exclude oxygen that may inhibit the free radical polymerization, a second PET layer may be laminated on top of the coated material, or alternatively the curing can be carried out under a nitrogen atmosphere. In the latter case shearing of the mesogenic material prior to polymerization is necessary to cause sufficient alignment of the cholesteric phase. When using a cationic photoinitiator oxygen exclusion is not needed, but water should be excluded.

These methods, however are only to be understood as examples that should not limit the scope of the invention. The person skilled in the art can easily find other suitable ways to carry out the polymerization.

Since the mixture may contain both polymerizable components with one (monofunctional) and with two or more polymerizable groups (multifunctional), polymerization and crosslinking are carried out in the same process.

By varying the concentration of the multifunctional mesogenic or non mesogenic components the crosslink density and thereby the product properties, such as the glass transition temperature, the temperature dependence of the optical properties, the thermal and mechanical stability and the solvent resistance can be tuned easily. According to the desired application e.g. films of a higher brittleness can be made by increasing the amount of multifunctional component. A higher brittleness is desirable in particular when the polymer film is subsequently ground to small flakes.

A high brittleness can also be achieved by using compounds with more than two polymerisable groups which may be mesogenic or non mesogenic. Typical examples for non mesogenic monomers with more than two polymerisable groups are trimethylpropane or pentaerythritoltetraacrylate.

In addition to the dye groups which are chemically bound to the liquid crystalline polymer material, the pigment flakes additionally may comprise one or more dyes or pigments which are not chemically bound to the liquid crystalline polymer material. These dyes or pigments can be selected of conventional inorganic pigments (e.g. titanium dioxide, iron (III) oxide, iron oxide yellow, chromium oxide, iron blue, carbon black), organic pigments (e.g. azo-pigments, metal complex pigments, polycyclic pigments), or dyes (e.g. polymethine dyes or triphenylmethane dyes).

Flakes can be formed by grinding the cured polymer film, for example by means of a pestle and mortar or by using a mechanised grinder or mill. By additional cooling to temperatures below 0° C. the polymer brittleness is increased and grinding is made easier. The resulting powder is then sieved to give pigment flakes of the desired size.

A preferred method to produce flakes of spherical shape with dimensions smaller than 100 μm is grinding with a pestle and mortar by hand or in a mechanised mortar mill.

Another method to produce more or less spherical flakes is by milling the polymer film in a ball mill. Depending on the size and the weight of the balls, particles with average dimensions of less than 100 μm, in particular of 5 to 10 μm can be obtained.

Another preferred method is milling the polymer film under cooling in a blade mill. This produces a powder of platelet shaped flakes with lateral dimensions from several hundreds of microns to 1 to 2 mm. These flakes can subsequently be ground further in a mortar to give platelets with lateral dimensions smaller than 100 μm.

Cooling of the sample during grinding or milling can be achieved for example by using a carbon dioxide/aceton bath. Another preferred method of cooling is the addition of dry ice powder or liquid nitrogen to the sample.

In some embodiments it is preferable to add an antistatic agent when milling the polymer material to avoid agglomeration of the particles.

Apart from the method described above, the following methods are preferred to produce chiral polymer flakes according to the invention:

Coating the chiral polymerizable mesogenic material onto a substrate which contains shallow indentations with a diameter of 10 to 100 μm, preferably 20 to 50 μm and a depth of 3 to 20 μm, preferably 4 to 10 μm. In this case the act of coating causes sufficient shear to give uniform alignment. In order to increase the quality of the alignment the material may additionally be sheared for example by means of a doctors blade or by applying a second substrate on top of the coated material as described above.

Gravure printing the chiral polymerizable mesogenic material in the shape of small droplets onto a substrate, for example a polyester web, using a gravure printing plate to leave droplets with a thickness of 3 to 20 μm, preferably 4 to 10 μm and a diameter of 10 to 100 μm, preferably 20 to 50 μm. The act of printing causes sufficient shear to give uniform alignment, however, here also the material may be additionally aligned by shearing with for example a doctors blade or by applying a second substrate on top of the droplets.

Spraying of the chiral polymerizable mesogenic material into an $N_2$ atmosphere to give small droplets with a diameter of 10 to 100 μm, which are cured by irradiation with strong UV light. The cured droplets may subsequently be ground to make smaller flakes.

Coating the chiral polymerizable mesogenic material onto a rotating drum, aligning by a knife edge, curing by irradiation with UV light and scraping off the cured polymer to yield small flakes.

Coating the chiral polymerizable mesogenic material onto a rotating drum containing dimples with a depth of 2 to 20 μm, preferably 3 to 10 μm and a diameter of 10 to 100 μm, preferably 20 to 50 μm, curing by UV irradiation and peeling off the drum.

Coating the chiral polymerizable mesogenic material onto a rotating drum containing stripes that are 2 to 20 μm, preferably 3 to 10 μm deep and 10 to 100 μm, preferably 20 to 50 μm across, aligning and curing as described above. After this the stripes are ground into fragments of the desired size.

Making an emulsion of the chiral polymerizable mesogenic material in an immiscible liquid and polymerising the droplets by heating or UV irradiation.

Adding a surfactant to the chiral polymerizable mesogenic material and blowing $N_2$ gas in to make a foam which is polymerized, scraped off and ground.

Extruding the chiral polymerizable mesogenic material under pressure through one or more slots with a width of 2 to 20 μm, preferably 3 to 10 μm, whereby the shearing produces good uniform alignment. The film is cured in an $N_2$ atmosphere.

Another preferred method uses a solid particle, preferably carbon black or graphite dipersed in a solution of the chiral polymerizable mesogenic material and two solvents. Solvent 1 does not dissolve the chiral polymerizable mesogenic material but solvent 2 does. Solvent 2 is boiled off and the precipitating chiral polymerizable mesogenic material forms a coating over the carbon particle which is then polymerised. This method produces particularly bright flakes.

Further preferred methods and examples for the preparation of pigment flakes can be taken from the International Application WO 97/30136, the entire disclosure of which is incorporated into this application by way of reference.

The flakes obtained by the above mentioned methods have dimensions from 1 to 100 μm. It is also possible, however, to chose the process parameters so that flakes with dimensions larger than 100 μm, preferably from 0.5 mm to 1.5 mm, are obtained. These flakes show particularly striking colour effects and are preferred in certain applications.

Platelet shaped pigment flakes are preferred, wherein the aspect ratio, which describes the ratio of lateral dimensions to thickness, is larger than 3:1, in particular from 3:1 to 20:1, very preferably from 5:1 to 10:1.

Further preferred are pigments with a granular shape, wherein the aspect ratio is less than 10:1, particularly less than 3:1, especially preferably wherein thickness, length and width are approximately the same.

For the use in inks and paints, the cholesteric pigment flakes can be dispersed in a transparent binder or fluid, or incorporated into plastics, depending on the application.

For some applications, it is preferable to use mixtures of flakes with different reflection maxima.

The cholesteric polymer flakes can be used as effect pigments in spraying or printing inks or paints or coloured plastics for decorative applications like for example cosmetic products. Other important fields of application are the automotive use, active or passive optical elements, like e.g. optical films such as polarizers or compensators, and security applications, for example in false-proof security labels such as ID cards, credit cards or tickets, or security marks e.g. for clothes which are visible in the dark.

As explained in detail above, a considerable advantage of the invention resides in the fact that the optical and the mechanical properties of the pigment flakes can all be controlled in the same process simply by changing the type and the concentration of the chiral and achiral, mono- and multifunctional, coloured and fluorescent mesogenic polymerizable compounds. Thus the pigment flakes can be tailored appropriately for the desired application.

The chiral polymerizable mesogenic material preferably comprises at least one polymerizable compound of formula I*

P-(Sp-X)$_n$-CG-R                         I* and optionally at least one polymerizable compound of formula I

P-(Sp-X)$_n$-MG-R                          I wherein
  P is a polymerizable group,
  Sp is a spacer group having 1 to 20 C atoms,
  X is a group selected from —O—, —S—, —CO—, —COO—, —OCO—, —O—COO—, —O—SO$_2$—, —SO$_2$—O— or a single bond, n is 0 or 1, R is H or an alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —O—$SO_2$—, —$SO_2$—O— or —C≡C— in such a manner that oxygen atoms are not linked directly to one another, or alternatively R is halogen, cyano or has independently one of the meanings given for P-(Sp-X)$_n$-, MG is a mesogenic or mesogenity supporting group, CG is a chromophoric or fluorescent chromophoric group which can in addition be chiral and/or mesogenic.

In a preferred embodiment of the invention the polymerizable mesogenic compounds are selected according to formula I and/or I*, wherein R has one of the meanings of P-(Sp-X)$_n$- as given above.

P in formula I and I* is preferably selected from
$CH_2$=CW—COO—,
WCH=CH—O—,

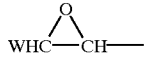

or $CH_2$=CH-Phenyl-(O)$_k$- with W being H, $CH_3$ or Cl and k being 0 or 1,

P is particularly preferably a vinyl group, an acrylate group, a methacrylate group, a propenyl ether group or an epoxy group, very particularly preferably an acrylate or methacrylate group.

If R in the compounds of formula I and I* is an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In the polymerizable mesogenic compounds of formula I and I* R may be an achiral or a chiral group. In case of a chiral group it is preferably selected according to the following formula IV:

—X$^1$—Q$^1$—*CH—Q$^2$
          |
          Q$^3$

IV wherein

X$^1$ has the meaning given for X,

Q$^1$ is an alkylene or alkyleneoxy group with 1 to 10 C atoms or a single bond, Q$^2$ is an alkyl or alkoxy group with 1 to 10 C atoms which may be unsubstituted, mono- or polysubstituted by halogen or CN, it being also possible for one or more non-adjacent $CH_2$ groups to be replaced, in each case independently from one another, by —C—C—, —O—, —S—, —NH—, —NH($CH_3$)—, —CO—, —COO—, —OCO—, —OCO—O—, —$SO_2$—O— or —O—$SO_2$— in such a manner that oxygen atoms are not linked directly to one another, or alternatively has the meaning given for P-Sp-, Q$^3$ is halogen, a cyano group or an alkyl or alkoxy group with 1 to 4 C atoms different from Q$^2$.

Preferred chiral groups R are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylval eryl oxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, for example.

In addition, mesogenic compounds of the formula I and I* containing an achiral branched group R can be of importance as comonomers, for example, as they reduce the tendency towards crystallization. Branched groups of this type generally do not contain more than one chain branch. Preferred branched groups are isopropyl, isobutyl (=methylpropyl), isopentyl (=3-methylbutyl), isopropoxy, 2-methylpropoxy and 3-methylbutoxy.

In another preferred embodiment R in formula I or I* is denoting a chiral group that is selected from the following groups:

an ethylenglycol derivative

—O—CH($CH_3$)—$CH_2$—O—R$^6$ wherein R$^6$ is an alkyl radical with 1 to 12 C atoms, or a group based on citronellol.

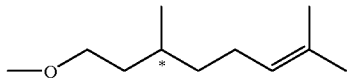

As for the spacer group Sp in formula I and I* all groups can be used that are known for this purpose to the skilled in the art. The spacer group Sp is preferably linked to the polymerizable group P by an ester or ether group or a single bond. The spacer group Sp is preferably a linear or branched alkylene group having 1 to 20 C atoms, in particular 1 to 12 C atoms, in which, in addition, one or more non-adjacent $CH_2$ groups may be replaced by —O—, —S—, —NH—, —NH($CH_3$)—, —CO—, —O—CO—, —CO—O—, —O—COO—, —$SO_2$—O—, —O—$SO_2$, —CH (halogen)—, —CH(CN)—, —CH=CH— or —C≡C—.

Typical spacer groups Sp are for example —($CH_2$)$_o$—, ($CH_2CH_2$O)$_r$—$CH_2CH_2$—, —$CH_2CH_2$—S—$CH_2CH_2$— or —$CH_2CH_2$NH—$CH_2CH_2$—, with o being an integer from 2 to 12 and r being an integer from 1 to 3.

Preferred spacer groups Sp are ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene and 1-methylalkylene, for example.

In a preferred embodiment of the invention the polymerizable mesogenic compounds of formula I and I* comprise a spacer group Sp that is a chiral group of the formula V:

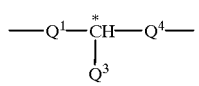

V wherein $Q^1$ and $Q^3$ have the meanings given in formula IV, and $Q^4$ is an alkylene or alkylene-oxy group with 1 to 10 C atoms or a single bond, being different from $Q^1$.

In the event that R or $Q^2$ are a group of formula P-Sp-X- or P-Sp- respectively, the spacer groups on each side of the mesogenic core may be identical or different.

In particular preferred are compounds of formula I and I* wherein n is 1.

In a preferred embodiment, the inventive anisotropic polymers and cholesteric polymer films are obtainable by copolymerizing mixtures comprising compounds of formula I and/or I* wherein n is 0 and compounds of formula I and/or I* wherein n is 1.

The mesogenic group MG in formula I is preferably selected of formula II:

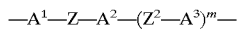

II with $A^1$, $A^2$ and $A^3$ being independently from one another 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene or naphthalene-2,6-diyl, it being possible for all these groups to be unsubsttuted, mono- or polysubstituted with halogen, cyano or nitro groups or alkyl, alkoxy or alkanoyl groups having 1 to 7 C atoms wherein one or more H atoms may be substituted by F or Cl, $Z^1$ and $Z^2$ being independently from one another —O—, —CO—, —COO—, —OCO—, —O—$SO_2$—, —$SO_2$—O—, —$CH_2CH_2$—, —$OCH_2$—, —$CH_2O$—, —CH=CH—, —C≡C—, —CH=CH—COO—, —OCO—CH=CH— or a single bond and m being 0, 1 or 2, Bicyclic and tricyclic mesogenic compounds are preferred.

Of the compounds of formula I especially preferred are those in which R is F, Cl, cyano, or optionally halogenated alkyl or alkoxy, or has the meaning given for P-(Sp-X)$_n$-, and MG is of formula II wherein $Z^1$ and $Z^2$ are —COO—, —OCO—, —$CH_2CH_2$—, —CH=CH—COO—, —OCO—CH=CH— or a single bond.

A smaller group of preferred mesogenic groups MG of formula II is listed below. For reasons of simplicity, Phe in these groups is 1,4-phenytene, Phe L is a 1,4-phenylene group which is substituted by at least one group L, with L being F, Cl, CN, $NO_2$ or an optionally fluorinated alkyl, alkoxy or alkanoyl group with 1 to 4 C atoms, and Cyc is 1,4-cyclohexylene.

| | |
|---|---|
| -Phe-$Z^1$-Phe- | II-1 |
| -Phe-$Z^1$-Cyc- | II-2 |
| -PheL-$Z^1$-Phe- | II-3 |
| -PheL-$Z^1$-Cyc- | II-4 |
| -Phe-$Z^1$-PheL- | II-5 |
| -Phe-$Z^1$-Phe.$Z^2$-Phe- | II-6 |
| -Phe-$Z^1$-Phe-$Z^2$-Cyc- | II-7 |
| -Phe-$Z^1$-Phe-$Z^2$-PheL- | II-8 |
| -Phe-$Z^1$-PheL-$Z^2$-PheL- | II-9 |
| -Phe-$Z^1$-Cyc-$Z^2$-Phe- | II-10 |
| -Phe-$Z^1$-Cyc-$Z^2$-Cyc- | II-11 |
| -Phe-$Z^1$-PheL-$Z^2$-Phe- | II-12 |
| -Phe-$Z^1$-Phe-$Z^2$-PheL- | II-13 |
| -PheL-$Z^1$-Phe-$Z^2$-PheL- | II-14 |
| -PheL-$Z^1$-PheL-$Z^2$-Phe- | II-15 |
| -PheL-$Z^1$-PheL-$Z^2$-PheL- | II-16 |

In these preferred groups $Z^1$ and $Z^2$ have the meaning given in formula I described above. Preferably $Z^1$ and $Z^2$ are —O—, —COO—, —OCO—, —CO—, —O—$SO_2$—, —$SO_2$—O—, —$CH_2CH_2$— or a single bond.

PheL in this preferred formulae is very preferably denoting 1,4-phenylene which is monosubstituted with L in the 2- or 3-position or disubstituted with L in the 2- and 3-position or in the 3- and 5-position, with L having each independently one of the meanings given above.

L is preferably F, Cl, CN, $NO_2$, $CH_3$, $C_2H_5$, $OCH_3$, $OC_2H_5$, $COCH_3$, $COC_2H_5$, $CF_3$, $OCF_3$, $OCHF_2$, $OC_2F_5$, in particular F, Cl, CN, $CH_3$, $C_2H_5$, $OCH_3$, $COCH_3$ and $OCF_3$, most preferably F, $CH_3$, $OCH_3$ and $COCH_3$.

MG in formula I particularly preferably has one of the following meanings

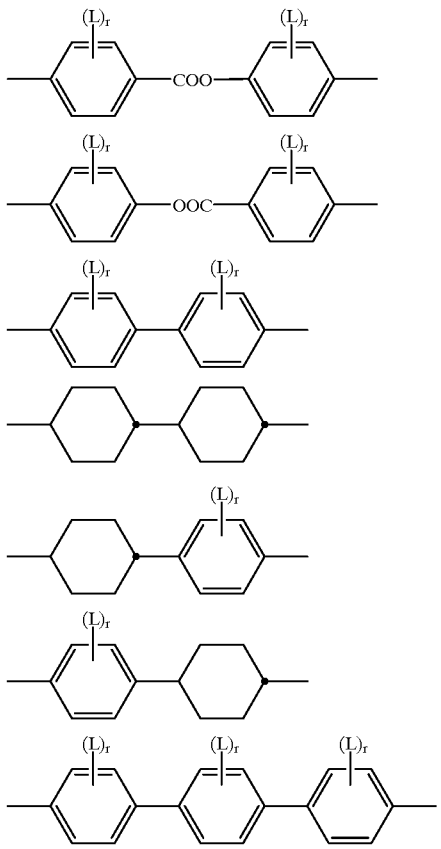

-continued

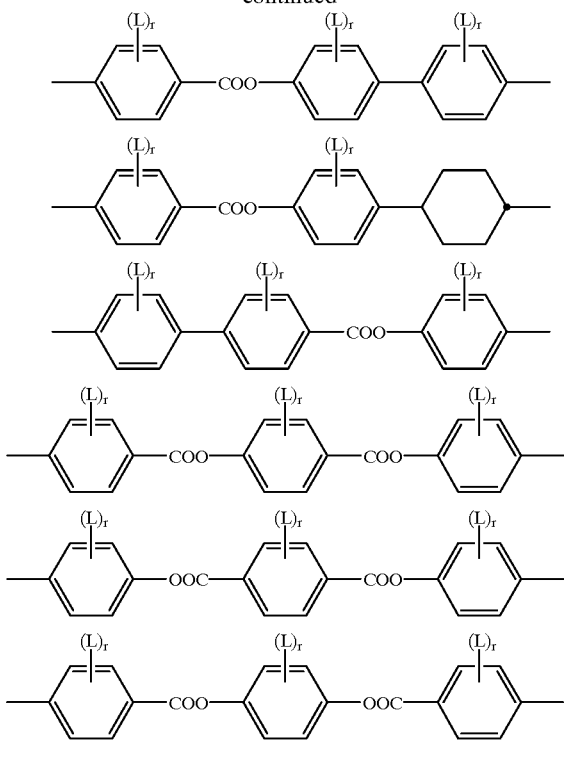

wherein L has the meaning given above and r is 0, 1 or 2.

The group

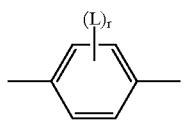

in this preferred formulae is very preferably denoting

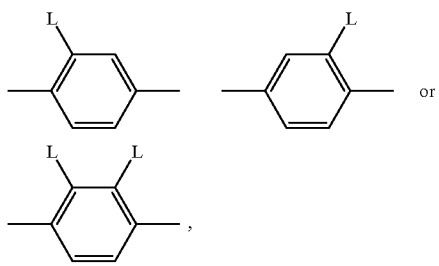

furthermore

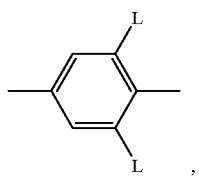

with L having each independently one of the meanings given above.

R in these preferred compounds is particularly preferably CN, F, Cl, OCF$_3$, or an alkyl or alkoxy group with 1 to 12 C atoms or has one of the meanings given for P-(Sp-X)$_n$-.

In another preferred embodiment of the present invention the compounds of formula I are chiral compounds which comprise a group MG having at least one center of chirality. In these compounds MG-R is preferably selected according to formula IIa or IIb:

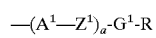

—(A$^1$—Z$^1$)$_a$-G$^1$-R  IIa

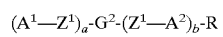

(A$^1$—Z$^1$)$_a$-G$^2$-(Z$^1$—A$^2$)$_b$-R  IIb wherein A$^1$, A$^2$ and Z$^1$ have the meaning given in formula II, R has one of the meanings given in formula I, with R in formula IIa denoting H, a and b are independently of each other 0, 1 or 2, -G$^1$-R in formula IIa is a terminal chiral group, such as for example a cholesteryl group,

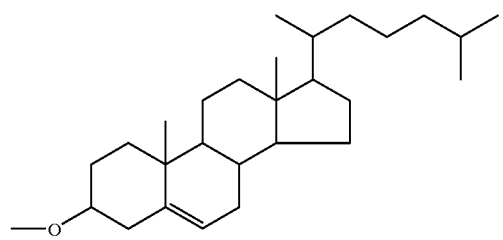

a terpenoid radical, like e.g. disclosed in the WO 96/17901, particularly preferably a menthyl group,

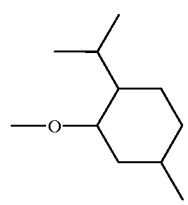

or a terminal chiral sugar derivative comprising a mono- or dicyclic radical with pyranose or furanose rings like, for example, a terminal group derived from the chiral sugars or sugar derivatives as isclosed e.g. in the international application WO 95/16007, and G$^2$ in formula IIb is a bivalent chiral group, like for example a (S,S)- or (R,R)-hydrobenzoin group

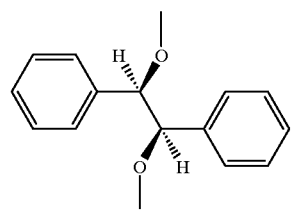

or a bivalent chiral sugar, sugar derivative or another bivalent chiral radical, as disclosed e.g. in the international application WO 95/16007, especially preferably a group based on 1,4:3,6-Dianhydro-D-sorbitol:

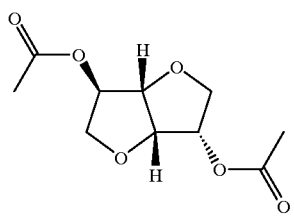

In case $G^2$ is a group based on 1,4:3,6-Dianhydro-D-sorbitol as disclosed above, Z is preferably denoting —CH=CH—.

Typical examples representing polymerizable mesogenic compounds of the formula I can be found in WO 93/22397; EP 0 261 712; DE 195 04 224; DE 44 08 171 or DE 44 05 316. The compounds disclosed in these documents, however are to be regarded merely as examples that should not limit the scope of this invention.

Furthermore, typical examples representing polymerizable mesogenic compounds like those of formula I are shown in the following list of compounds, which is, however, to be understood only as illustrative without limiting the scope of the present invention:

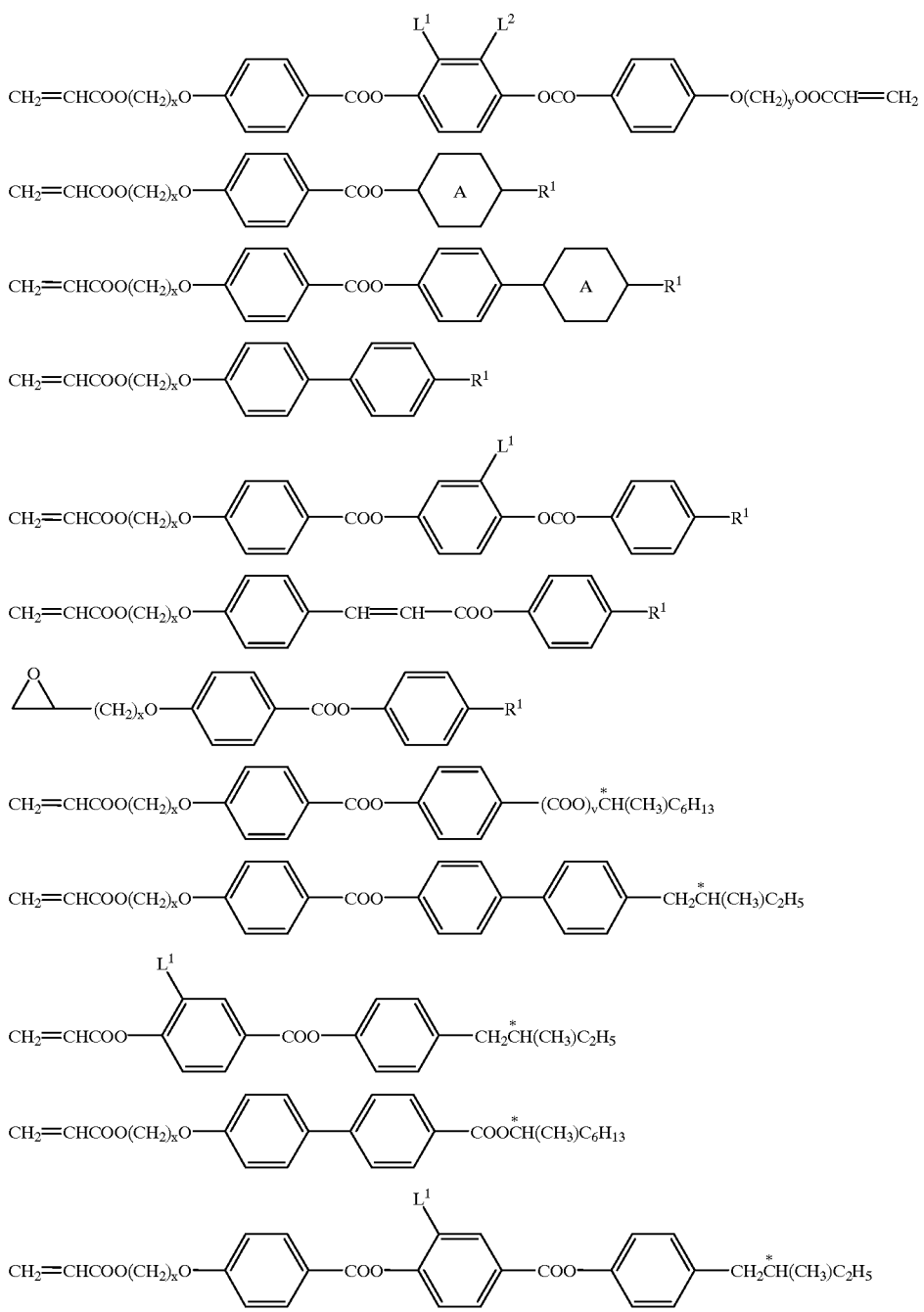

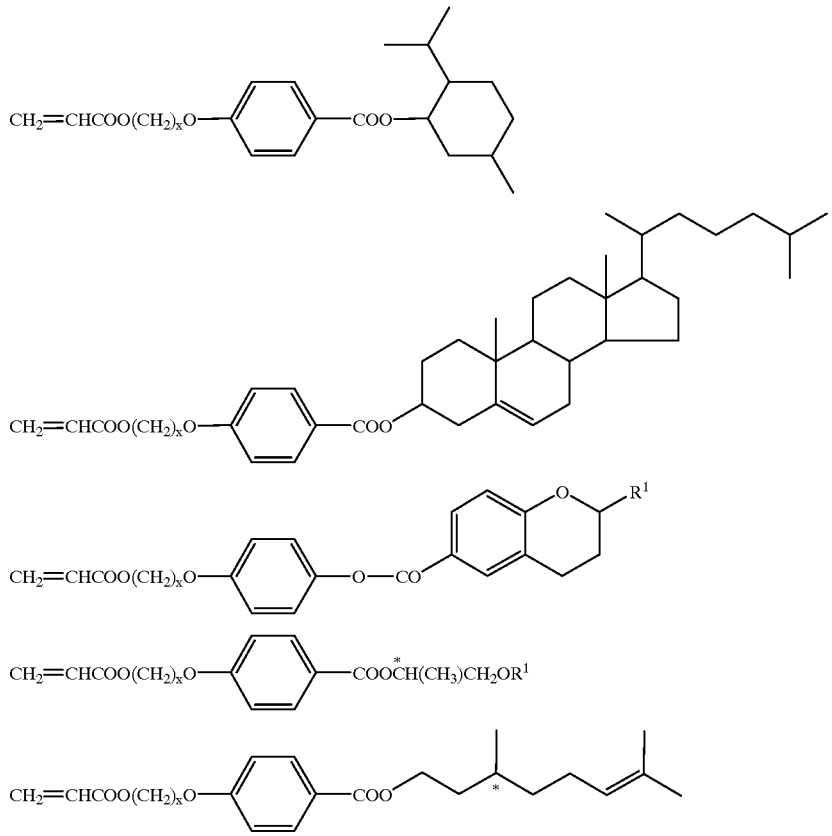

In these compounds x and y are each independently 1 to 12, A is a 1,4-phenylene or 1,4-cyclohexylene group, $R^1$ is halogen, cyano or an optionally halogenated alkyl or alkoxy group with 1 to 12 C atoms and $L^1$ and $L^2$ are each independently H, F, Cl, CN, or an optionally halogenated alkyl, alkoxy or alkanoyl group with 1 to 7 C atoms.

The chromophoric group CG in formula I* is preferably selected of the following formula

wherein $A^1$ and $Z^1$ each independently have the meaning given in formula II, c and d are 0, 1 or 2, Ch is a chromophore or a fluorescent chromophore, which can in additon be chiral and/or mesogenic.

Of the compounds of formula 1* especially preferred are those in which R is H, alkyl or alkoxy or has the meaning given for P-(SP-X)$_n$-, X is —O—, —CO—, —COO—, —OCO—, —SO$_2$—O—, —O—SO$_2$— or a single bond, and CG is of formula III, wherein $Z^1$ is —O—, —COO—, —OCO—, —CO—, —SO$_2$—O—, —O—SO$_2$— or a single bond.

A smaller group of preferred chromophoric groups CG of formula III is listed below. In these groups, Phe, Phe L and Cyc have the meaning given in formulae II-1 to II-16 above. The following list comprises the preferred formulae III-1 to III-32 as well as their corresponding mirror images.

| | |
|---|---|
| -Ch-Z$^1$-Phe- | III-1 |
| -Ch-Z$^1$-Cyc- | III-2 |
| -Ch-Z$^1$-PheL- | III-3 |
| -Ch-Z$^1$-Phe-Z$^1$-Phe- | III-4 |
| -Ch-Z$^1$-Phe-Z$^1$-PheL- | III-5 |
| -Ch-Z$^1$-Phe-Z$^1$-Cyc- | III-6 |
| -Ch-Z$^1$-PheL-Z$^1$-PheL- | III-7 |
| -Ch-Z$^1$-PheL-Z$^1$-Cyc- | III-8 |
| -Ch-Z$^1$-Cyc-Z$^1$-Cyc- | III-9 |
| -Ch-Z$^1$-Cyc-Z$^1$-Phe- | III-10 |
| -Ch-Z$^1$-Cyc-Z$^1$-PheL- | III-11 |
| -Phe-Z$^1$-Ch-Z$^1$-Phe- | III-12 |
| -Phe-Z$^1$-Ch-Z$^1$-Cyc- | III-13 |
| -Phe-Z$^1$-Ch-Z$^1$-PheL- | III-14 |
| -PheL-Z$^1$-Ch-Z$^1$-PheL- | III-15 |
| -Cyc-Z$^1$-Ch-Z$^1$-Phe- | III-16 |
| -Cyc-Z$^1$-Ch-Z$^1$-Cyc- | III-17 |
| -Cyc-Z$^1$-Ch-Z$^1$-PheL- | III-18 |
| -Phe-Z$^1$-Phe-Z$^1$-Ch-Z$^1$-PheL- | III-19 |
| -Phe-Z$^1$-PheL-Z$^1$-Ch-Z$^1$-PheL- | III-20 |
| -PheL-Z$^1$-PheL-Z$^1$-Ch-Z$^1$-PheL- | III-21 |
| -Phe-Z$^1$-Cyc-Z$^1$-Ch-Z$^1$-PheL- | III-22 |
| -Cyc-Z$^1$-Cyc-Z$^1$-Ch-Z$^1$-PheL- | III-23 |
| -Phe-Z$^1$-Ch-Z$^1$-Phe-Z$^1$-Phe- | III-24 |
| -Phe-Z$^1$-Ch-Z$^1$-Phe-Z$^1$-Cyc- | III-25 |
| -Phe-Z$^1$-Ch-Z$^1$-Phe-Z$^1$-PheL- | III-26 |
| -Phe-Z$^1$-Ch-Z$^1$-PheL-Z$^1$-PheL- | III-27 |
| -Phe-Z$^1$-Phe-Z$^1$-Ch-Z$^1$-Phe-Z$^1$-Phe- | III-28 |
| -Phe-Z$^1$-PheL-Z$^1$-Ch-Z$^1$-Phe-Z$^1$-PheL- | III-29 |
| -Cyc-Z$^1$-Cyc-Z$^1$-Ch-Z$^1$-Cyc-Z$^1$-Cyc- | III-30 |
| -Phe-Z$^1$-PheL-Z$^1$-Ch-Z$^1$-Cyc-Z$^1$-Cyc- | III-31 |
| -Phe-Z$^1$-PheL-Z$^1$-Ch-Z$^1$-Phe-Z$^1$-Cyc- | III-32 |

In these preferred formulae, $Z^1$, PheL and L have the preferred meanings as described for the formulae II-1 to II-16 above. R in the preferred compounds has the preferred meanings as given above.

As chromophoric group Ch in principle every chromophoric group may be used that is known to the skilled in the art. Following is a list of typical examples for chromophoric groups Ch of the formula III. This list is, however, only to be understood as explaining, but not limiting the scope of the present invention.

Y in these formulae is denoting a single bond.

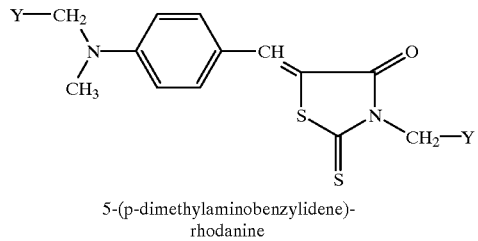

5-(p-dimethylaminobenzylidene)-rhodanine

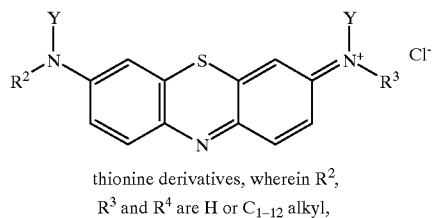

thionine derivatives, wherein $R^2$, $R^3$ and $R^4$ are H or $C_{1-12}$ alkyl,

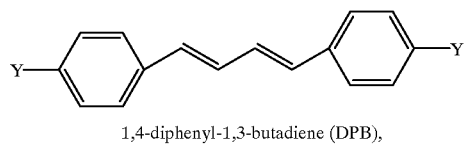

1,4-diphenyl-1,3-butadiene (DPB),

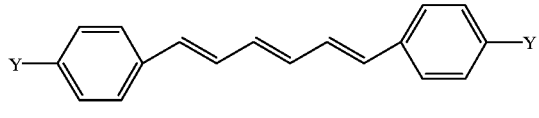

1,6-diphenyl-1,3,5-hexatriene(DPH),

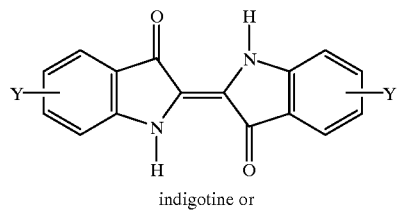

indigotine or

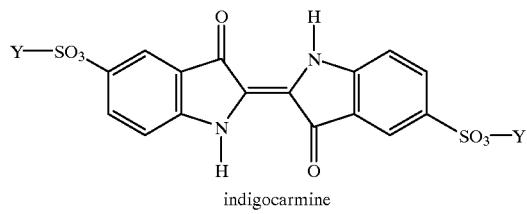

indigocarmine and their substitution products, oxazole derivatives, like e.g.

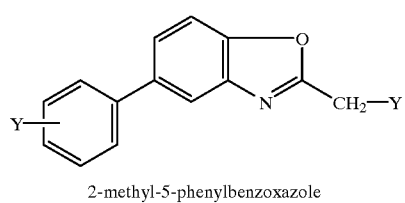

2-methyl-5-phenylbenzoxazole

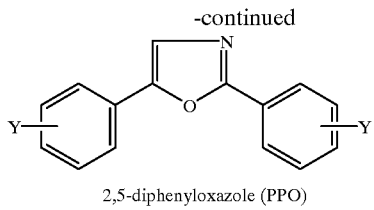

2,5-diphenyloxazole (PPO)

or

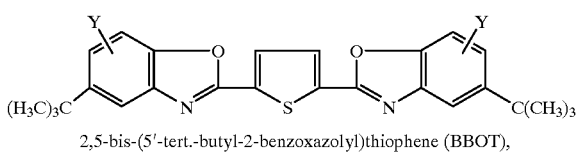

2,5-bis-(5'-tert.-butyl-2-benzoxazolyl)thiophene (BBOT), azo dyes, such as

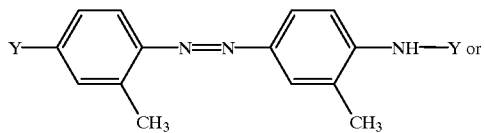

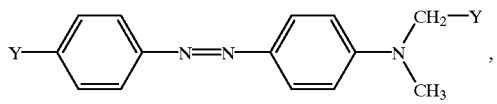

or anthrachinone derivatives, such as

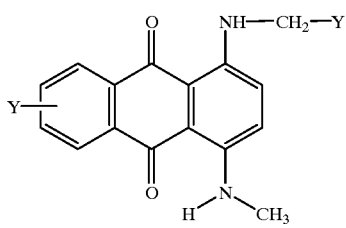

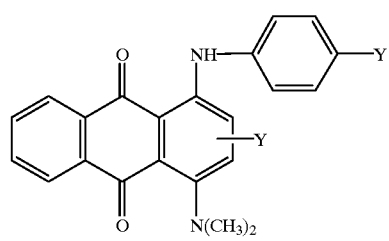

or

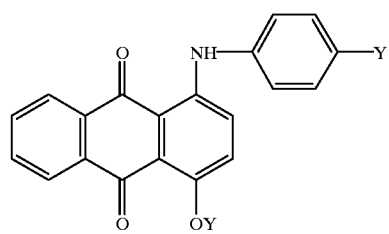

Particularly preferred are compounds of formula I* wherein CG is representing a fluorescent chromophoric group. When using a chiral polymerzable mesogenic material comprising compounds of formula I* that are bearing such a fluorescent chromophoric group, pigment flakes can be obtained that show particularly striking colour effects.

Typical examples for fluorescent chromophoric groups Ch in formula III can be taken from the following list, which should only illustrate the scope of the present invention without limiting it.

Fluorescein derivatives, like e.g.

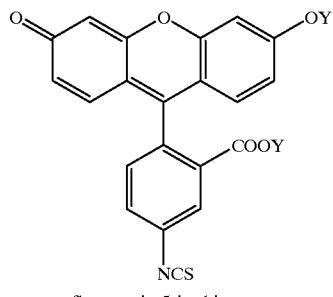

fluorescein-5-isothiocyanate

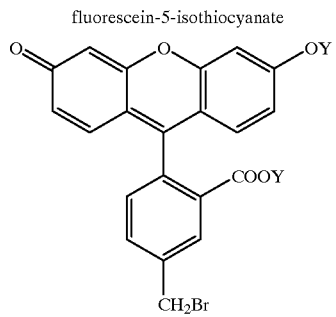

5-(bromomethyl)fluorescein or

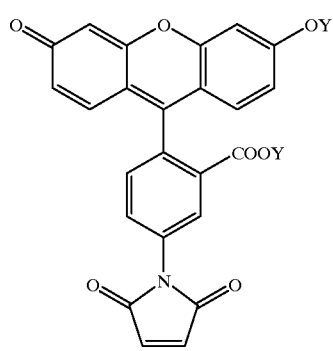

fluorescein-5-maleimide, derivatives of 2,5-dihydropyrrolo[3,4-c]pyrrole-1,4-dione (DPPD),

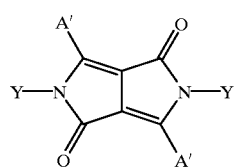

wherein A' has the meaning given in formula IIIA, perylene derivatives, such as

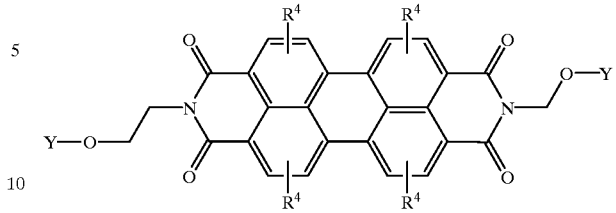

substituted 2,9-di(2-hydroxyethyl)-anthra[2,1,9-def:6,5,10-d'e'f']diisoquinoline-1,3,8,10-tetrone, wherein $R^4$ has one of the meanings of formnula IIIB, benzimidazole drivatives, such as

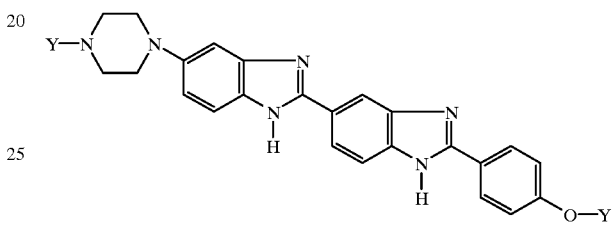

a derivative of 2'-(4-oxy-phenyl)-5-(piperazin-1-yl)-1H,1'H-[2,5']bibenzoimidazol, which is commercially available as Hoechst 33342 (Kodak), benzoxazoles, like e.g.

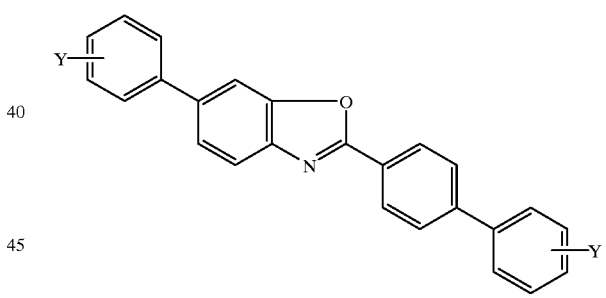

2-(4-biphenylyl)-6-phenylbenzoxazole (PBBO)

or

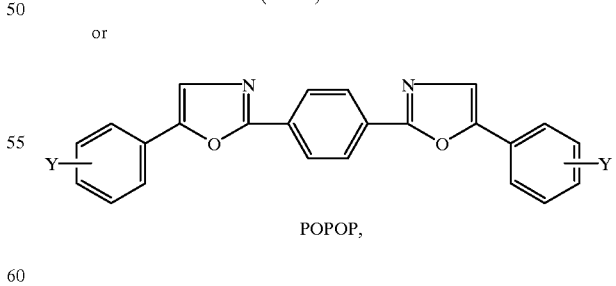

POPOP, stilbenes, such as

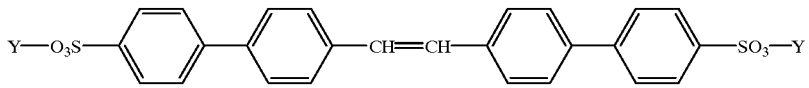

4,4'-bis-(p-sulfophenyl)stilbene, polyphenylenederivatives

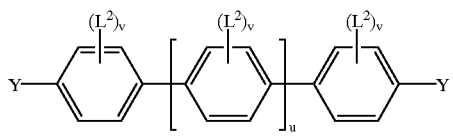

wherein u is 2 to 4, $L^2$ is H or $C_{1-8}$ alkyl or alkoxy and v is 1 to 4, and their spiroanalogues, like

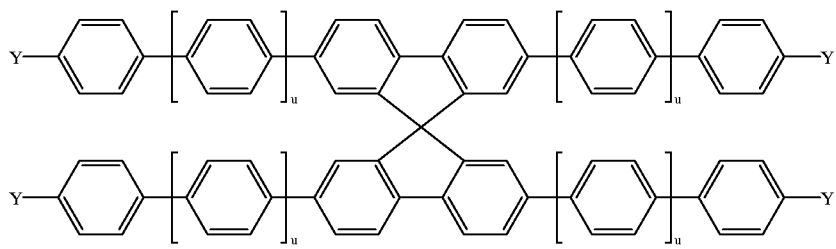

wherein one or more phenylene rings can be mono- or polysubstituted by $L^2$ as defined above, and u has the meaning given above, or dyes comprising cholesteryl groups, like e.g.

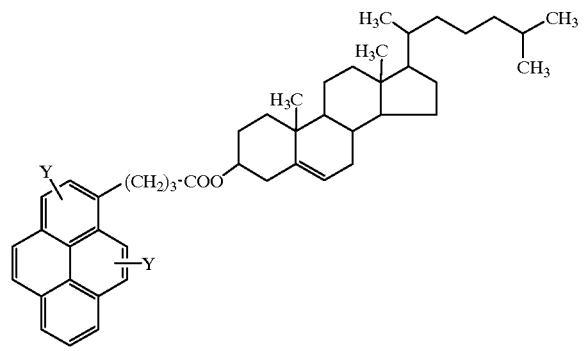

cholesteryl-1-pyrenedecanoate.

The polymerizable mesogenic compounds of formula I and I* as disclosed in the foregoing and the following can be prepared by methods which are known per se and which are described in the documents cited above and, for example, in standard works of organic chemistry such as, for example, Houben-Weyl, Methoden der organischen Chemie, Thieme-Verlag, Stuttgart.

Further methods of preparation, in particular for the preparation of compounds of formula I*, can be taken from the examples.

A preferred group of polymerizable compounds of formula I* comprising fluorescent dyes are pyrrolopyrrolidones of the following formula

IIIA

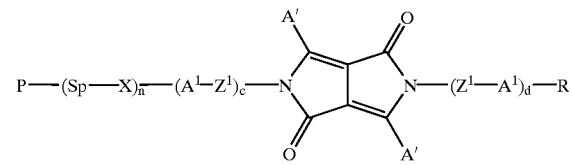

wherein
P, Sp, X, n and R have the meaning of formula I,
$A^1$, $Z^1$, c and d have the meaning of formula III, and
$A^1$ is phenyl in which, in addition, one or more CH groups may be replaced by N, cyclohexyl in which, in addition, one or two non-adjacent $CH_2$ groups may be replaced by O and/or S, cyclohexenyl or naphthalene-2-yl, it being possible for all these groups to be unsubstituted, mono- or polysubstituted with halogen, cyano or nitro groups or alky, alkoxy or alkanoyl groups having 1 to 7 C atoms wherein one or more H atoms may be substituted by F or Cl, The pyrrolopyrrdidone dyes exhibit a brilliant colour, acceptable solubility and have a low influence on the glass temperature of the polymer. Inventive pigment flakes obtained from an inventive chiral polymerizable mesogenic material comprising such dyes show particularly brilliant colour effects.

Particularly preferred are difunctional polymerizable compounds of formula IIIA, i.e. wherein R is P-(Sp-X)n-.

Further preferred are compounds of formula IIIA wherein A' is phenyl, in which one or 2 CH groups may be replaced by N, which is unsubstituted or substituted in one to four, preferably one, two or three positions by F, Cl, CN, $OCF_3$ or linear or branched alkyl or alkoxy with 1 to 7, preferably 1 to 4, C atoms.

A' is particularly preferably phenyl, 3,5-dimethylphenyl, 2-methylphenyl, 4-tert.butylphenyl, or 4-methyl-, 4-fluoro-, 4-chloro- or 4-cyanophenyl.

The compounds of formula IIIA can be prepared by known methods from intermediates (A) and (B) according to reaction scheme 1, wherein A', $A^1$, $Z^1$ and c have the meanings of formula IIIA and R' denotes R or $P-(Sp-X)_n-$. Some specific methods of preparation can be taken from the examples.

Scheme 1

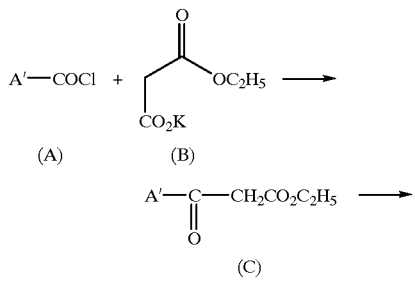

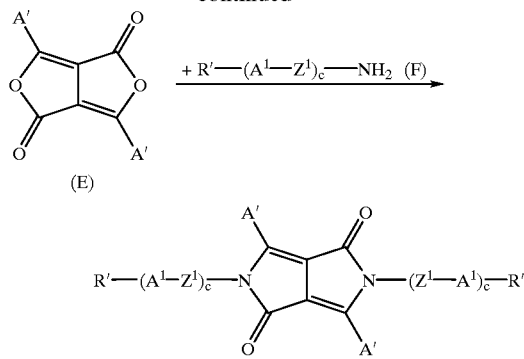

The starting materials (A) and (B) are commercially available and are easily transformed into intermediate (C) (for example according to the method described in Synthesis 1993, 290). (C) is dimerized into (D), which is then transformed into (E) by a procedure worked out for simple pyrrolopyrroldiones (Liebigs Ann. 1996, 679). The compounds (F) are used as precursors for the synthesis of liquid crystal azo dyes or isothiocyanates and are well known from several patents and publications, like e.g. the EP 0 250 505 or DE 40 27 869.

Another preferred group of polymerizable compounds of formula I* comprising fluorescent dyes are perylene derivatives of the following formula

IIIB

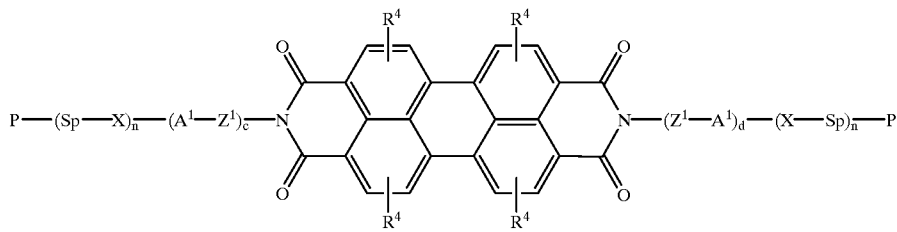

-continued

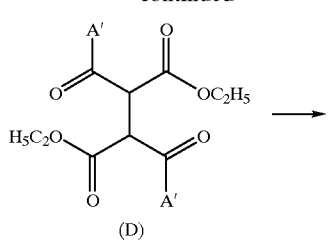

wherein

P, Sp, X and n have the meanings of formula I, $A^1$, $Z^1$, c and d have the meanings of formula III, and $R^4$ is denoting $-(O-Phe)_e-R^5$, with $R^5$ being H, F, Cl, CN, $NO_2$, optionally halogenated alkyl, alkoxy or alkanoyl with 1 to 12 C atoms, Phe denoting 1,4-phenylene and e being 0 or 1.

Particularly preferred are compounds of formula IIIB wherein $R^4$ is H.

Further preferred are compounds with the following substitution pattern of $R^4$

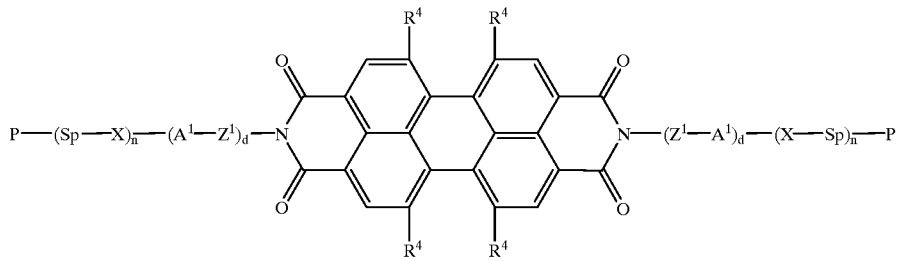

$R^4$ in these compounds is preferably F, Cl, alkyl or alkoxy with 1 to 8 C atoms or O—Phe.

The compounds of formula IIIB can be prepared by known methods according to the following reaction schemes, wherein x is 1 to 8 and Sp, $A^1$, $Z^1$, c and d and $R^4$ have the meaning of formula IIIB. Some specific methods of preparation can be taken from the examples.

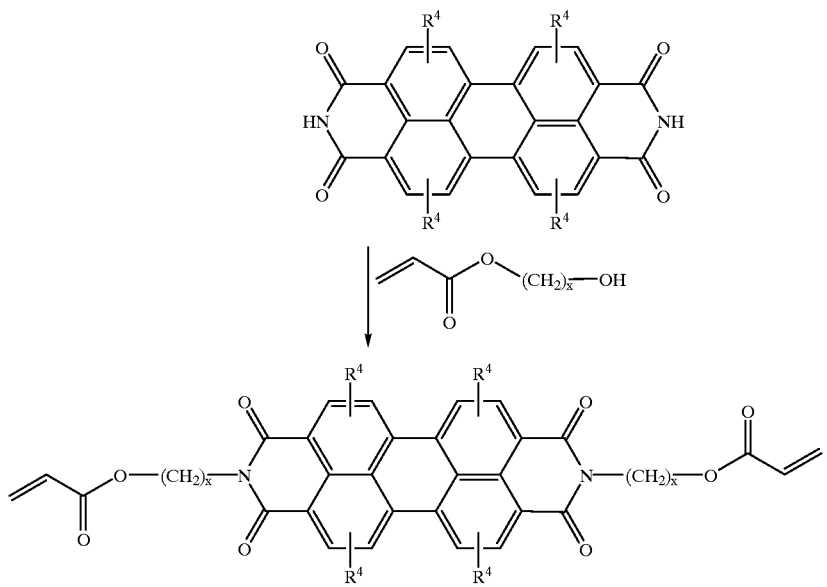

Scheme 2

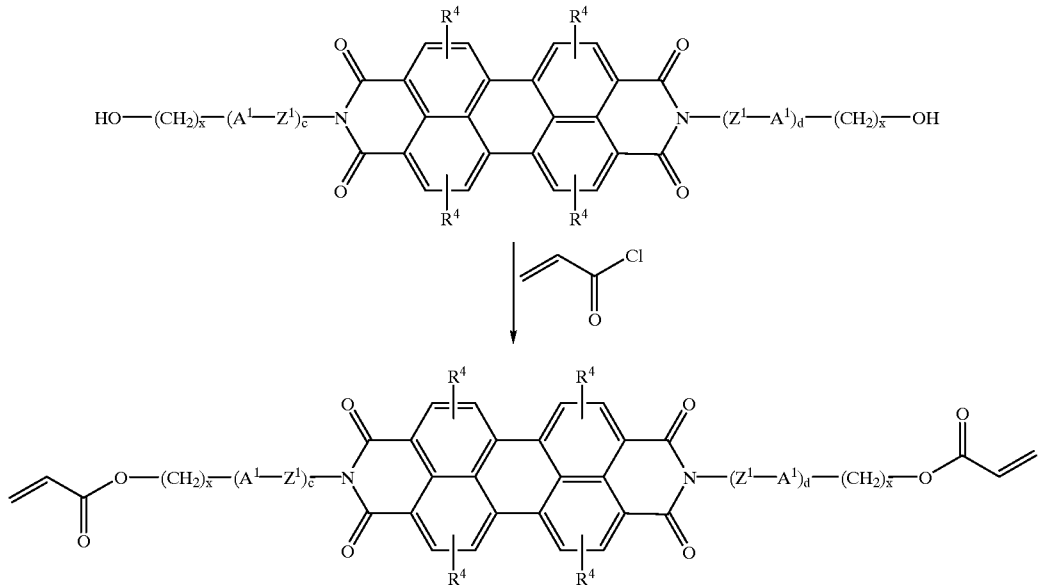

Scheme 3

The compounds of formula IIIA and IIIB are new and are another object of the present invention.

In a preferred embodiment of the present invention, the pigment flakes are obtainable from a chiral polymerizable mesogenic material comprising the following components a1) at least one chiral polymerizable mesogenic compound according to formula I having one polymerizable functional group, a2) at least one achiral polymerizable mesogenic compound according to formula I having two or more polymerizable functional groups, b1) at least one polymerizable mesogenic compound according to formula I* having one polymerizabie functional group, c) a photoinitiator, and d) optionally a nonmesogenic compound having two or more polymerizable functional groups.

In another particularly preferred embodiment of te present invention, the mixture of the chiral polymerizable mesogenic material comprises

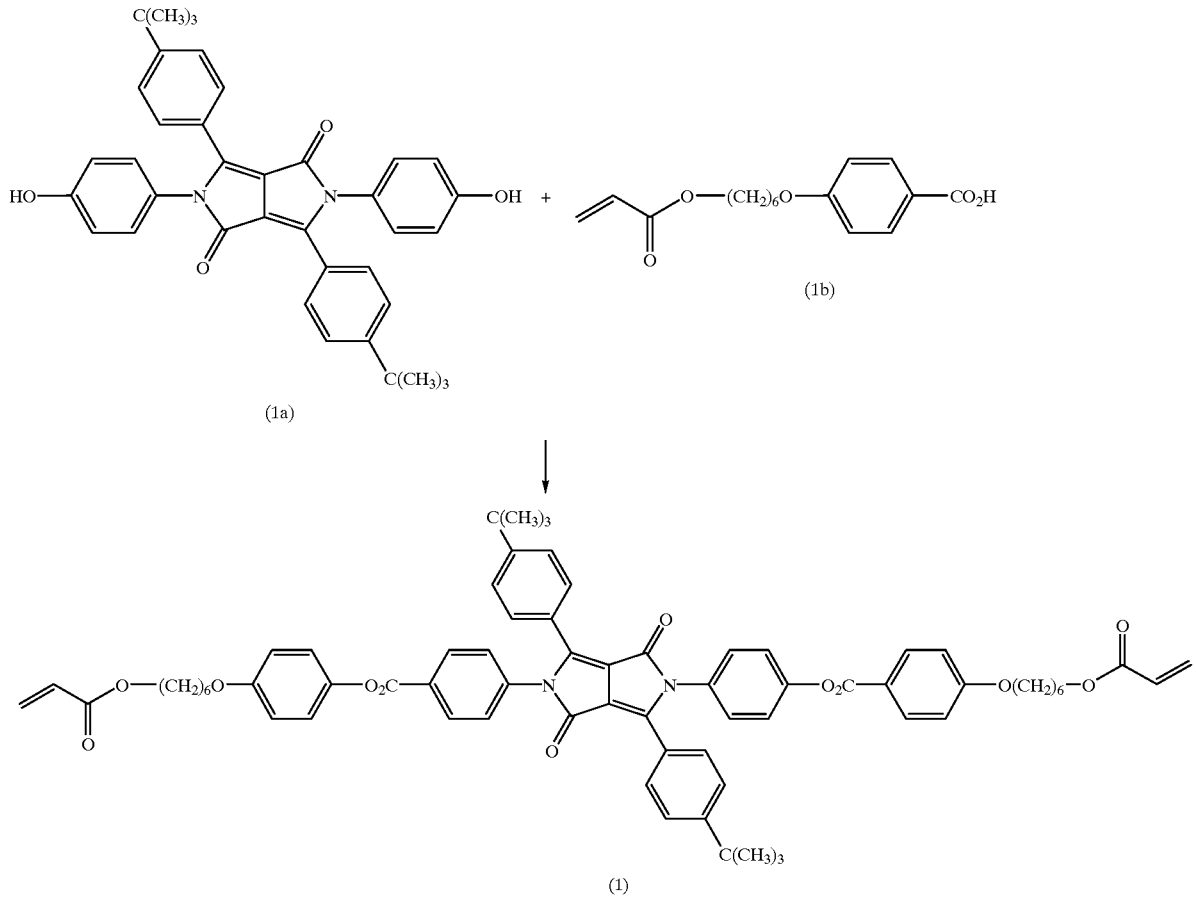

a1) at least one chiral polymerizable mesogenic compound according to formula I having one polymerizable functional group, a3) at least two achiral polymerizable mesogenic compounds according to formula I having one polymerizable functional group, b2) at least one polymerizable mesogenic compound according to formula I* having two or more polymerizable functional groups, c) a photoinitiator, and d) optionally a non-mesogenic compound having two or more polymerizable functional groups.

The mixture according to this particularly preferred embodiment preferably comprises two to six, most preferably two to four different mesogens according to formula I having one polymerizable functional group.

Preferably the chiral polymerizable mesogenic material comprises at least one polymerizable compound of formula I*, IIIA or IIIB according to one of the preferred definitions as described above.

A chiral polymerizable mesogenic material as described above and below is another object of the present invention.

The complete disclosure of all applications, patents and publications mentioned hereinbefore and hereinafter is introduced into this application by way of reference.

EXAMPLE 1

Compound (1) is prepared as follows

The compound is prepared analoguously to a known method (Liebigs Ann. 1996, 679) from the corresponding diketofuranofurane and 4.bromoaniline. The resulting bromoderivative is transferred via lithiation with BuLi at −90° C., boronation with borotrimethylate and oxidation with $H_2O_2$ to give (1a).

6,4 g of (1a), 5 9 of (1b) and 0.3 g dimethylaminopyridine are dissolved in 300 ml dichloromethane. At 0° C. to 5° C. 5.4 g dicylclohexylcarbodiimide in 125 ml dichloromethane are added. After stirring for 24 h at room temperature the precipitate was filtered off and the solvent was evaporated. The residue was recrystallized from toluene/acetone 4:1 to give compound (1) at a yield of 7.5 g (red/orange crystals).

EXAMPLE 2

Compound (2) is prepared as follows

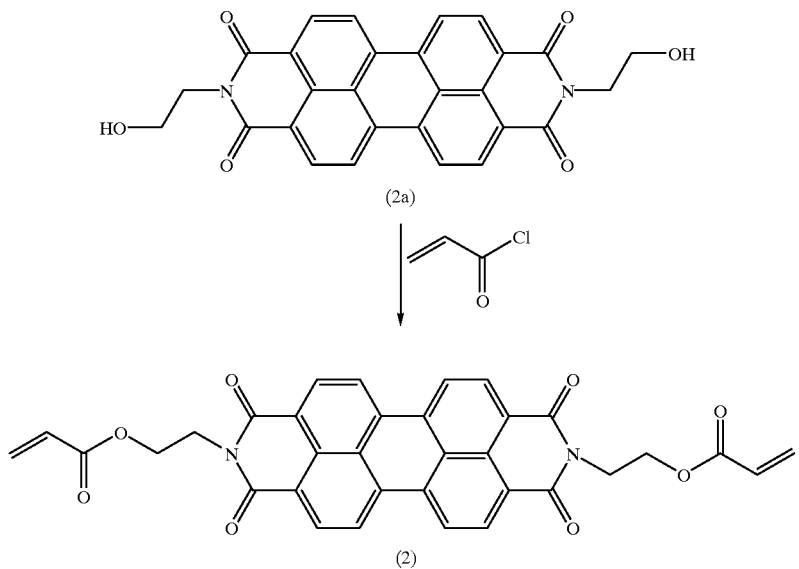

(2a)

↓

(2)

To a solution of 2.3 g (2a) (a perylene with IUPAC nomenclature 2,9-di(2-hydroxyethyl)-anthra[2,1,9-def:6,5,10d'e'f']diisoquinoline-1,3,8,10-tetrone, commercially available from Syntec, Germany) in 75 ml dioxane that is heated to 70° C., 1.14 g triethylamine and afterwards 1 g acryloylchloride, each in 5 ml dioxane, are added together with a small amount of p-benziquinone to inhibit polymerisation. After heating for 1 h, the cooled reaction mixture is poured in 300 ml of water and the precipitate is recrystallized from toluene.

EXAMPLE 3
Compound (3) is prepared as follows 3.9 g (3a) are dissolved in 300 ml of tetrahydrofurane. This solution was added to a mixture of 2.48 g of 6-hydroxyhexylacrylate, 3.54 9 of triphenylphosphine and 2.35 g of diazodicarbonic diethylester in 50 ml tetrahydrofurane containing a small amount of p-benzoquinone to inhibit polymerization. After stirring for 16 h at room temperature the solvent was evaporated off. The residue was purified by chromatography on silica gel with toluene/ethylacetate 9:1.

EXAMPLE 4

The following compounds are prepared in analogy to example 3

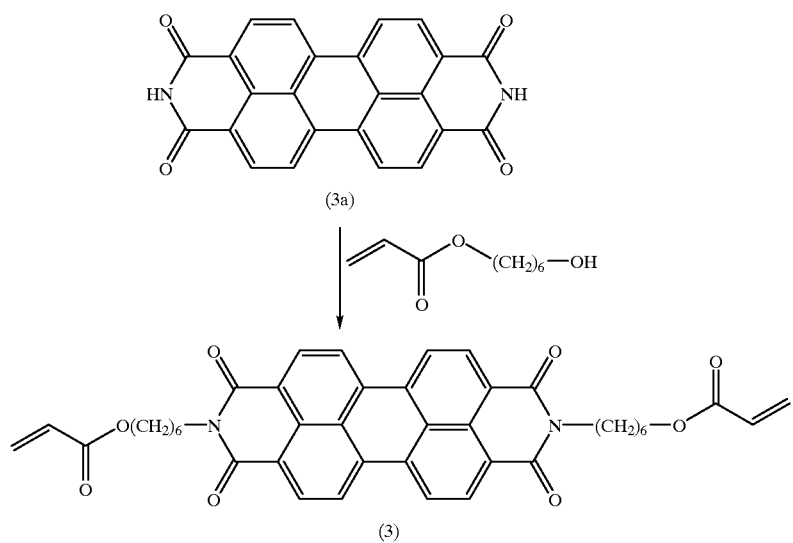

(3a)

↓

(3)

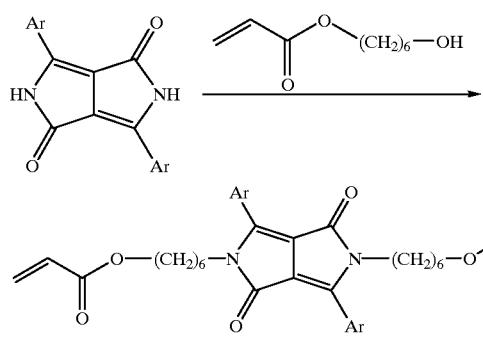

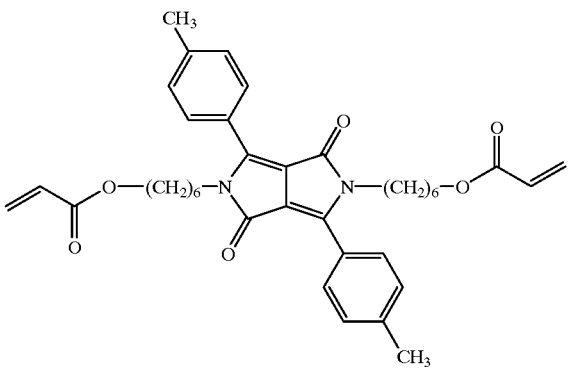

wherein Ar is phenyl, 3,5-dimethylphenyl, 2-methylphenyl or 4-t-butylphenyl.

EXAMPLE 5

Compound (5) is prepared as follows

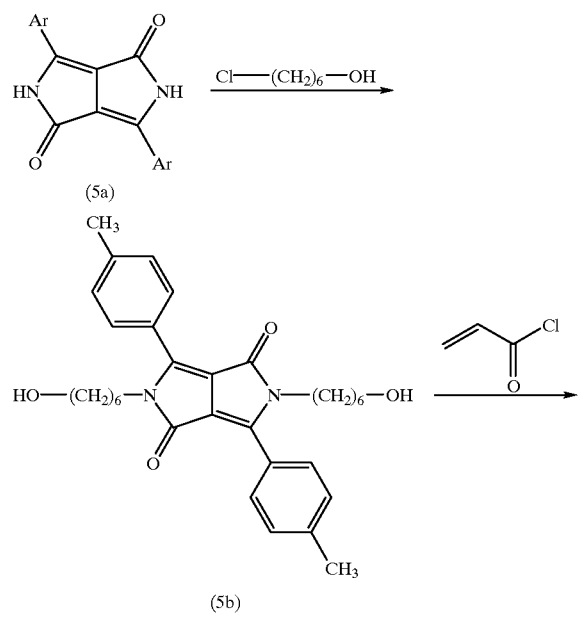

A mixture of 6.32 g (5a), 1.19 g sodiummethylate and 40 ml dimethylformamide is heated to 100° C. and 3.28 g of 6-chlorohexanol-1 are added under continuous heating to 100° C. for 6 h. The mixture is poured into 300 ml water. The precipitate is recrystallized from a 1,1,2-trichloroethanettoluene mixture to give (5b).

The resulting bisAhydroxyhexyl derivative (5b) is transformed to the acrylate as described in example 3 or by esterification with the acrylic acid either by bicyclohexylimide or by boiling at a water separator using either 1,1,2-trichloroethane or toluene and p-toluenesulfonic acid.

EXAMPLE 6

Compound (6) is prepared according to reaction scheme 1 as follows

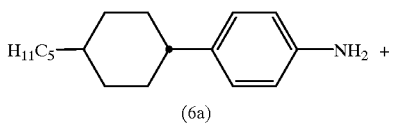

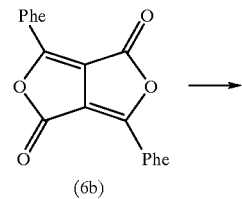

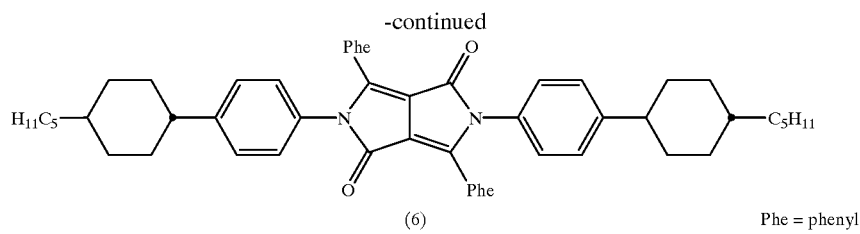

(6)            Phe = phenyl 2 g of the dilactone (6b), 8.45 g of the aniline (6a) and 3.7 g dicyclohexylcarbodiimide in 250 ml are stirred at room temperature for 5 days. The precipitated urea is filtered off and the residue obtained after evaporation is purified by chromatography on silica gel with chloroform. The purest fractions are recrystallized from toluene/ethylacetat to give orange crystals.

EXAMPLE 7

(Modification of mica surface by wetting agent)

A 95% ethanol—5% water solution is adjusted to pH 4.5–5.5 with acetic acid. The wetting silane (7) is added under stirng to give finally a concentration of 2%. After some minutes the mica is added to the solution and stirred for 3 minutes The particles are filtered off, washed shortly twice with ethanol and afterwards cured for 10 minutes at 110° C.

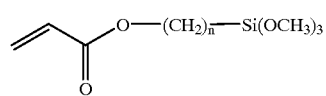

(7)

EXAMPLE 8

(Preparing the mica for alignment by rubbing).

The surface of the mica coated with the coreactive acrylate (7) is oriented by passing it through two counter-rotating rolls covered by Nylon (Nylon YO/10N from Yoshikawa).

EXAMPLE 9

A polymerizable liquid crystalline mixture is formulated comprising the following compounds

| | |
|---|---|
| compound (8) | 91.5% |
| compound (9) | 6.0% |
| compound (5) | 0.5% |
| Darocure 1173 | 2.0% |

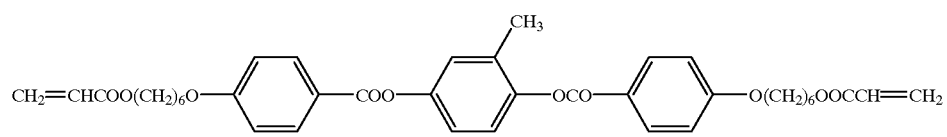

(8)

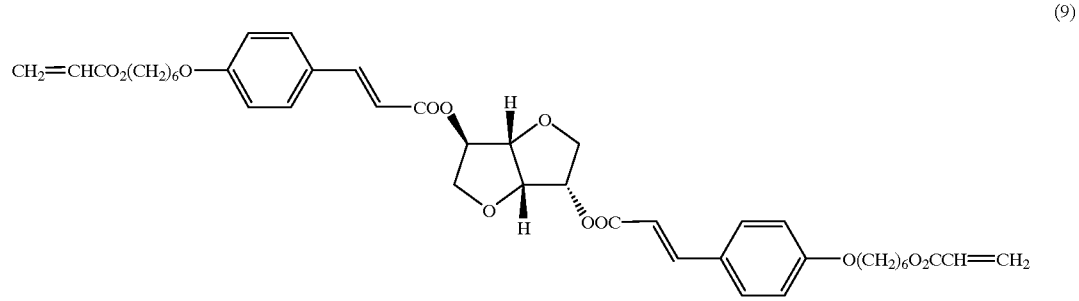

(9)

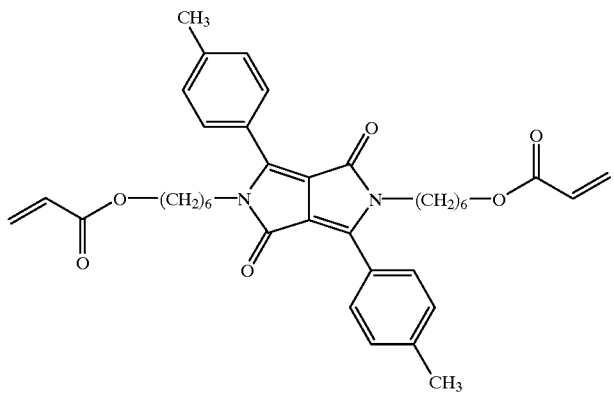

(5)

Compound (8) can be prepared in analogy to the method described in WO 93/22397. The synthesis of compound (9) is described in the non-prepublished EP 96110577.2. The synthesis of compound (5) is described in example 5. Darocure is a commercially available photinitiator from Ciba Geigy.

Mica particles that have been rubbed as described in example 2 are transported to a moving band made of stretched polyethylene which is covered by a thin layer of the mixture described above. The mixture is kept in its liquid crystalline phase by heating to the isotropic phase and supercooling to 60° C. The same mixture is then sprayed in a thin layer on the upper surface of the mica flakes.

The layers are then photopolymerized by irradiation with an UV lamp (320–520 nm) under an argon atmosphere for five minutes.

After 24 hours the mica flakes are scraped off the band. They show a glossy pearlescent effect, which is varying in accordance with the viewing angle from red to a brillant blue-green effect caused by the fluorescence of compound (5) and the cholesteric reflective effect induced by compound (9).

The preparation of flakes as described above can be repeated with the same or another inventive chiral polymerizable mesogenic material comprising another dye in addition to or instead of the fluorescent dye, with or without the above chiral polymerizable compounds or other chiral polymerizable compounds.

It is also possible to add small amounts of non-polymerizable dyes to the chiral polymerizable mesogenic material, like e.g. 0.2 to 2% of 9,10-diphenylanthracene (from Merck), 9,10-bisphenylethynylanthracene (from Aldrich), or the foluwing compound (from Hoechst)

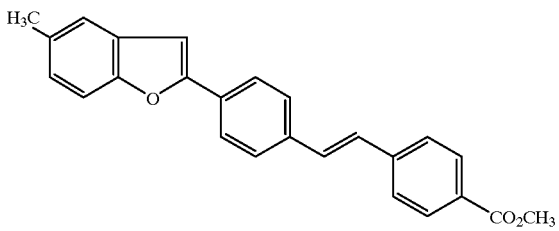

in order to vary the colour effects.

A simple colour tuning of the coating can furthermore be achieved by applying azodyes (in the range of 0 1% to 10%) or other dyes like indigo as mentioned above.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Pigment flakes comprising a chiral liquid crystalline polymer material serving as a carrier material or being coated on a carrier material and at least one fluorescent dye that is chemically bound to the polymer, wherein the chiral liquid crystalline polymer material, forms a crosslinked three dimensional network and wherein the pigment flakes exhibit the property of reflecting selected wavelengths of incident light.

2. Pigment flakes according to claim 1, which are additionally comprise one or more dyes or pigments which are not chemically bound to the chiral liquid crystalline polymer material.

3. Pigment flakes according to claim 1, wherein the flakes have a thickness from 0.1 to 100 $\mu$m and lateral dimensions from 1 to 1000 $\mu$m.

4. Pigment flakes according to any of the claims 1, wherein they are obtained from a chiral polymerizable mesogenic material comprising at least one polymerizable mesogenic compound of formula I*

$$P\text{-}(Sp\text{-}X)_n\text{-}CG\text{-}R \qquad\qquad I^*$$

and optionally at least one polymerizable mesogenic compound of formula I $$P\text{-}(Sp\text{-}x)_n\text{-}MG\text{-}R \qquad\qquad I$$

wherein

P is a polymerizable group,

Sp is a spacer group having 1 to 20 C atoms,

X is a group selected from —O—, —S—, —CO—, —COO—, —OCO—, —O—COO—, —SO$_2$—O—, —O—SO$_2$— or a single bond, n is 0 or 1, and R is H or an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is halogen, cyano or has independently one of the meanings given for P-(SP-X)$_n$-, MG is a mesogenic or mesogenity supporting group of formula II:

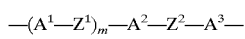  II with

A$^1$, A$^2$ and A$^3$ being independently from one another 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl, Z$^1$ and Z$^2$ being independently from one another —O—, —CO—, —COO—, —OCO—, —SO$_2$—O—, —O—SO$_2$—, —CH$_2$CH$_2$—, —OCH$_2$—, —CH$_2$O—, —CH=CH—, —C≡C—, —CH=CH—COO—, —OCO—CH=CH— or a single bond and m being 0, 1 or 2, and CG is a chromophoric group or a fluorescent chromophoric group of the following formula

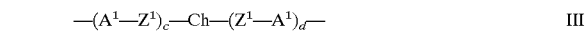  III wherein

A$^1$ and Z$^1$ have the meaning given in formula II, c and d are 0, 1 or 2,

Ch is denoting a chromophore or a fluorescent chromophore, which can in addition be chiral and/or mesogenic.

5. Pigment flakes according to claim 4, wherein the chiral polymerizable mesogenic material comprises at least one compound of formula I and at least one compound of formula I*.

6. Pigment flakes according to claim 4, wherein the compound of the formula I* is of the following formula IIIA:

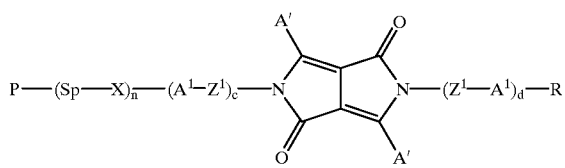

wherein

P, Sp, X, n and R have the meaning given for formula I,

A$^1$, Z$^1$, c and d have the meaning given for formula III, and

A' is phenyl in which, one or more CH groups may be replaced by N, cyclohexyl in which, one or two non-adjacent CH$_2$ groups may be replaced by O and/or S, cyclohexenyl or naphthalene-2-yl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl.

7. Pigment flakes according to claim 4, wherein the compound of the formula I* is of the following formula IIIB:

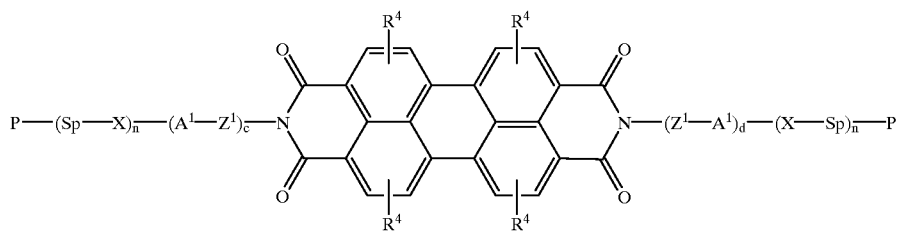

wherein

P, Sp, X and n have the meanings given for formula I,

A$^1$, Z$^1$, c and d have the meaning given for formula III, and

R$^4$ is denoting —(O—Phe)$_e$—R$^5$, with R$^5$ being H, F, Cl, CN, NO$_2$, optionally halogenated alkyl, alkoxy or alkanoyl with 1 to 12 C atoms, Phe denoting 1,4-phenylene and e being 0 or 1.

8. Pigment flakes according to claim 1 comprising a chiral liquid crystalline polymer material, said liquid crystalline polymer material being coated onto a carrier material, wherein the pigment flakes are obtained from a chiral polymerizable mesogenic material by a process comprising the following steps a) coating a thin layer of the chiral polymerizable mesogenic material onto the carrier material, b) aligning the chiral polymerizable mesogenic material in the coated layer into a uniform orientation, c) polymerizing said chiral polymerizable mesogenic material by exposure to heat or actinic radiation.

9. Pigment flakes according to claim 8, wherein the chiral polymerizable mesogenic material comprises at least two polymerizable mesogenic compounds, at least one of which comprises a chromophoric group.

10. Pigment flakes according to claim 8, wherein the chiral polymerizable mesogenic material comprises at least one polymerizable mesogenic compound having one polymerizable group and at least one polymerizable mesogenic compound having two polymerizable groups.

11. Pigment flakes according to claim 8, wherein the chiral polymerizable mesogenic material comprises at least one chiral polymerizable mesogenic compound and at least one achiral polymerizable mesogenic compound.

12. Pigment flakes according to claim 1, comprising a chiral liquid crystalline polymer material, said liquid crystalline polymer material serving as carrier material, wherein the pigment flakes are obtained from a chiral polymerizable mesogenic material by a process comprising the following steps
   a) coating a thin layer of the chiral polymerizable mesogenic material onto a substrate or between two substrates,
   b) aligning the chiral polymerizable mesogenic material in the coated layer into a uniform orientation,
   c) polymerizing said chiral polymerizable mesogenic material by exposure to heat or actinic radiation,
   d) optionally removing the substrate, or, if two substrates are present, one or both of the substrates from the polymerized material,
   e) grinding the polymer film into small particles of the desired dimensions.

13. Pigment flakes according to claim 12, wherein the chiral polymerizable mesogenic material comprises at least two polymerizable mesogenic compounds, at least one of which comprises a chromophoric group.

14. Pigment flakes according to claim 12, wherein the chiral polymerizable mesogenic material comprises at least one polymerizable mesogenic compound having one polymerizable group and at least one polymerizable mesogenic compound having two polymerizable groups.

15. Pigment flakes according to claim 12, wherein the chiral polymerizable mesogenic material comprises at least one chiral polymerizable mesogenic compound and at least one achiral polymerizable mesogenic compound.

16. Pigment flakes according to claim 1, wherein the chiral liquid crystalline polymer material is coated on a carrier material which is a platelet-shaped substrate.

17. Pigment flakes according to claim 1, wherein the carrier material is mica.

18. A printing ink, spray paint, cosmetic, colored plastic, optical element or security application paint or ink composition which comprises pigment flakes according to claim 1.

* * * * *

UNITED STATES PATENT AND TRADEMARK OFFICE
CERTIFICATE OF CORRECTION

PATENT NO. : 6,291,065 B1
DATED : September 18, 2001
INVENTOR(S) : Poetsch et al It is certified that error appears in the above-identified patent and that said Letters Patent is hereby corrected as shown below:

Column 40,
Line 53 change "I" to -- 1 --.

Signed and Sealed this

Twenty-first Day of May, 2002

Attest:

JAMES E. ROGAN
Attesting Officer
Director of the United States Patent and Trademark Office